(No Model.)

A. G. BAKEN.
CAR COUPLING.

No. 497,044. Patented May 9, 1893.

WITNESSES:

Alanson G. Baken.
INVENTOR
ATTORNEY.

UNITED STATES PATENT OFFICE.

ALANSON G. BAKEN, OF PARK CITY, UTAH TERRITORY.

CAR-COUPLING.

SPECIFICATION forming part of Letters Patent No. 497,044, dated May 9, 1893.

Application filed January 31, 1893. Serial No. 460,402. (No model.)

*To all whom it may concern:*

Be it known that I, ALANSON G. BAKEN, a citizen of the United States, residing at Park City, in the county of Summit and Territory of Utah, have invented certain new and useful Improvements in Car-Couplings; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in car couplings, and the object of my invention is the provision of a coupling which will be automatic in action, which will not become detached under any circumstance, which will be durable and which can be applied to cars at a moderate cost.

The invention consists of a car coupling embodying novel features of construction and combination of parts to produce a practical coupling as will appear from the following description and drawings, in which—

Figure 1:
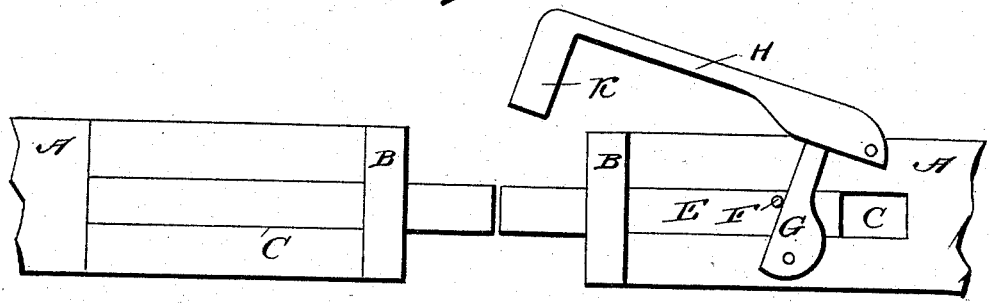
Figure 2:
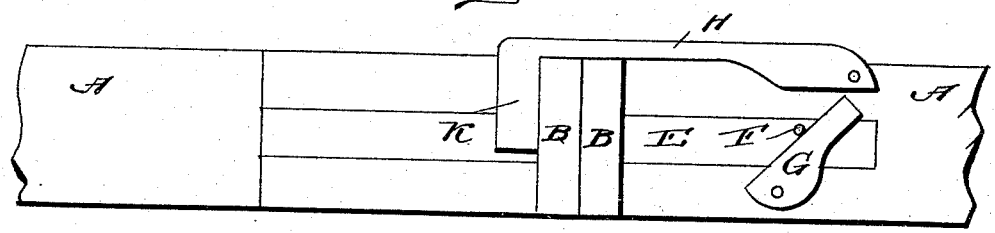
Figure 3:
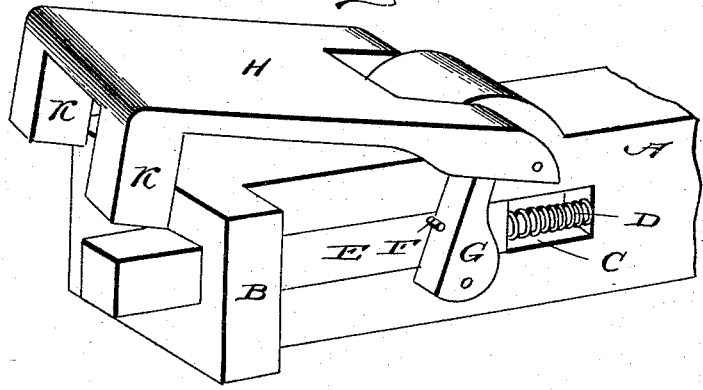

Figure 1 represents a side elevation of the coupling as it appears when uncoupled. Fig. 2 represents a similar view with the parts coupled, and Fig. 3 represents a perspective view partly in section, showing the bumper springs within the draw-bars.

Referring by letter to the drawings, A designates the draw bars of my coupling, having the coupling heads B at their inner ends, having the channels or grooves C at the sides forming sockets for the bumper springs D, and guiding the bumper rods E, as is evident. On one of the bumper rods is a lug or stud F and adjacent thereto a pivoted arm G, which normally engages the lug on the bumper rod and holds the bumper rod out to receive the impact of the bumper of the approaching draw-head and said arm also holds the coupling hook H which is pivoted to the draw bar and has the hooks or claws K for engaging the draw head to effect the coupling in a raised or uncoupled position and when the approaching draw-head contacts with the spring bumper rod it is pushed inward releasing the pivoted catch and allowing the coupling hook to fall and couple with the draw-head and thus automatically effect the coupling, as will be readily understood.

From the foregoing it is evident that I provide a coupling which is simple, inexpensive and durable, which can be applied to all cars and which is automatic in action thus avoiding the necessity of attendants passing between the cars at the risk of their lives to couple the cars.

I claim as my invention—

1. A car coupling, consisting of the draw bars having the heads, and the coupling hooks pivoted on the draw bars and adapted to embrace the head and the upper side of the draw bar to effect the coupling, the pivoted support on one of the draw-bars, the bumper rod having the lug for engaging the pivoted support, and the bumper-rod carried by the other draw-bar for engaging the rod having the lug, all adapted to operate as described.

2. A car coupling consisting of the draw bars having the heads, the channels in the bars, the bumper rods in the channels, the spring engaging one of the rods, the lug on one of the rods, the pivoted arm, and the coupling hook supported by the arm and adapted to be coupled by contact of the lug with the arm.

In testimony whereof I affix my signature in presence of two witnesses.

ALANSON G. BAKEN.

Witnesses:
E. L. HEAL,
F. J. McLAUGHLIN.